United States Patent [19]

Knox

[11] 4,292,004
[45] Sep. 29, 1981

[54] PLATFORM LEG PLUG

[75] Inventor: Lloyd C. Knox, Duncan, Okla.

[73] Assignee: Halliburton Company, Duncan, Okla.

[21] Appl. No.: 47,198

[22] Filed: Jun. 11, 1979

Related U.S. Application Data

[62] Division of Ser. No. 828,065, Aug. 26, 1977, Pat. No. 4,215,951.

[51] Int. Cl.³ .............................................. E02B 17/04
[52] U.S. Cl. .................................. 405/203; 405/227; 405/224; 138/89
[58] Field of Search ............... 405/224, 227, 225, 226, 405/195; 166/188; 138/89

[56] References Cited

U.S. PATENT DOCUMENTS

| | | | |
|---|---|---|---|
| 2,607,425 | 8/1952 | Taylor | 166/188 X |
| 2,776,015 | 1/1957 | Bielstein | 138/89 |
| 3,161,037 | 12/1964 | Lagerquist | 138/89 X |
| 3,353,566 | 11/1967 | Cepkauskas et al. | 138/89 |
| 3,577,737 | 5/1971 | Burleson | 138/89 X |
| 3,747,541 | 7/1973 | Reese | 138/89 X |
| 4,160,612 | 7/1979 | Britton et al. | 405/227 |

Primary Examiner—Dennis L. Taylor
Attorney, Agent, or Firm—John H. Tregoning; James R. Duzan

[57] ABSTRACT

A retrievable plug for sealing a jacket leg of an offshore platform or similar cylindrical member. The plug comprises a plug body and upper and lower plug body retaining means which restrain the plug body from movement within the jacket leg or similar cylindrical member.

14 Claims, 8 Drawing Figures

PLATFORM LEG PLUG

This is a division of application Ser. No. 828,065, filed Aug. 26, 1977, now U.S. Pat. No. 4,215,951.

This invention relates to a reusable plug for sealing hollow cylindrical members, in particular, the jacket legs of an offshore platform.

Typically, when constructed, an offshore platform has the jacket legs sealed to prevent water leakage therein to facilitate towing operations and platform erection. With the jacket legs sealed against water leakage, the offshore platform may either be directly towed to the desired erection site or placed on barges to be towed to the erection site. After being towed or shipped by means of towed barges to the erection site, the offshore platform is positioned on the sea bottom by the controlled flooding of one or more of the jacket legs. However, an offshore platform may float with its top being submerged to a much greater depth than its bottom if the top of the offshore platform contains more structure than the bottom of the offshore platform and if the top of the offshore platform has less buoyant force exerted thereon by the sealed jacket legs. If erection of the offshore platform by controlled flooding were tried at the point when the platform is floating with its top submerged to a greater depth than its bottom, the offshore platform would sink top first.

One method of preventing an offshore platform from sinking top first during erection is to attach lines to the submerged floating top of the offshore platform and physically lift the top of the offshore platform out of the water. This method has the disadvantage, however, of requiring divers to secure the lines to the submerged offshore platform top and requires extra barges to carry the necessary hoisting gear.

Another method of preventing an offshore platform from sinking top first during erection is to attach additional flotation means, such as tanks, to the top of the offshore platform thereby insuring that the top of the offshore platform floats higher in the water or completely out of the water when compared to the bottom of the offshore platform. However, this method has the disadvantage of requiring the removal and disposal of the flotation means after erection and higher platform construction costs.

An alternative method for preventing an offshore platform from sinking top first during erecton is to place retrievable plugs in the jacket legs of the offshore platform to allow partial flooding of the jacket legs thereby insuring the bottom of the offshore platform being submerged to a greater depth than the top.

One type of plug used to seal the jacket legs of offshore platforms is a steel cup retained within a cylindrical housing the same diameter as the jacket leg and welded therein. The steel cup is retained within the cylindrical housing by means of a molded elastomeric member which has a portion of the cup retrieving cable spirally wrapped within the elastomeric member. To retrieve the cup from the jacket leg a force is applied to the free end of the cable at the top of the jacket leg which, in turn, progressively rips the molded elastomeric member apart thereby freeing the steel cup to move upwardly in the jacket leg. However, since the plug and its housing must be installed in the jacket leg during the early construction phase of the platform, any changes which would affect the platform's weight distribution are undesirable to make because they would require relocation of the plug and its housing in the jacket leg.

Another type of plug used to seal the jacket legs of an offshore platform is an inflatable type plug having a plurality of shoes anchoring the plug in position in the jacket leg. An inflatable plug has the disadvantages of the inflatable member rupturing during the towing operation which would cause an attendant loss of buoyancy, and added equipment must be installed on the platform during towing operations to assure the inflation pressure of the inflatable member is maintained.

In contrast to these prior art plugs, the present invention provides a simple, highly reliable, easily retrievable plug for sealing the jacket legs of an offshore platform or other large diameter cylindrical member comprising a plug body having either a compression set type packer member or sealing cups to seal the jacket leg and an upper plug body retaining means and lower plug body retaining means to secure the plug body in position in the jacket leg.

Figure 1:
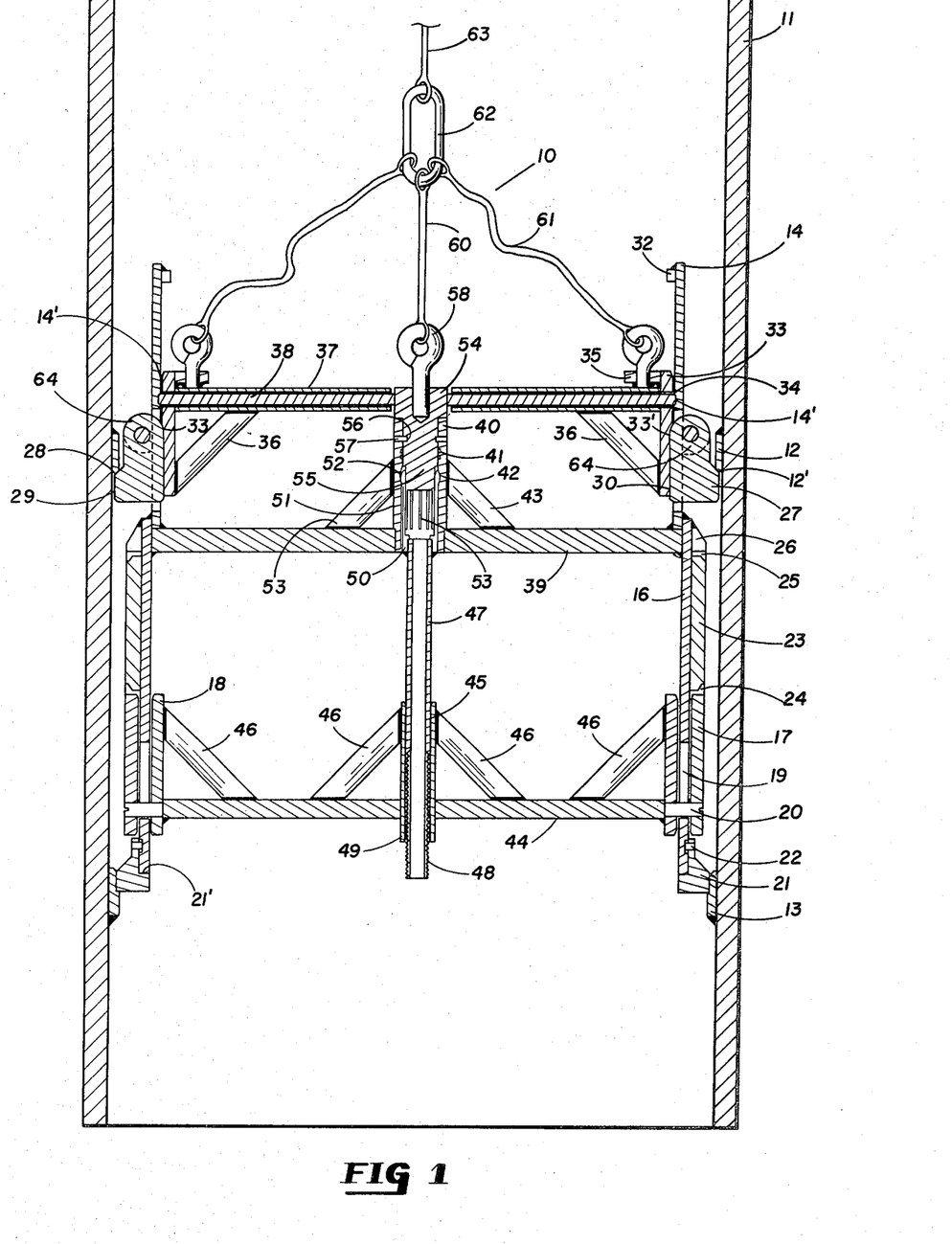
FIG. 1 is a cross-sectional view of the invention installed in a jacket leg with the compression type packer member in its uncompressed state.

Referring to FIG. 1, the invention is shown in its preferred embodiment. The retrievable plug comprises a plug body 10 and upper plug body retaining means 12 and lower stepped plug body retaining means 13 which restrain the plug body from movement within the jacket leg 11.

The plug body 10 comprises a packer mandrel, packer member 23, packer setting sleeve and locking dogs 27.

The packer mandrel is formed by cylindrical members 14 and 16 which are secured together by any suitable fastening means, although welding is preferred. The cylindrical member 14 has a plurality of locking dogs 27 mounted thereon in slots 15 to mate with upper plug body retaining ring 12 thereby preventing axial movement of the plug body 10 in one direction of the jacket leg 11. Each locking dog 27 is pivotally attached to the cylindrical member 14 by means of a mounting pin 31 which, in turn, is attached to cylindrical member 14 by means of ears 64 (shown in phantom) or any other suitable fastening means, such as welding. Each locking dog 27 is formed with an angular, arcuate peripheral face 28 which mates with a corresponding angular, arcuate peripheral face 12' of retaining ring 12, an outer arcuate peripheral face 29 and an inner arcuate peripheral face 30 which abuts dog locking sleeve 33.

The cylindrical member 16 is formed with a plurality of slots 19 containing a plurality of pins 20 which secure outer cylindrical member 17 and inner cylindrical member 18 of the packer setting sleeve together. About the lower periphery of the cylindrical member 16 is mounted a retaining ring 21 secured to cylindrical member 16 by means of fasteners 22 and having shoulder 21' abutting the end of cylindrical member 16. The retaining ring 21 mates with lower stepped plug body retaining ring 13 to prevent axial movement of the plug body 10 in the other direction in the jacket leg 11 and serves to center the plug body 10 in the jacket leg 11. Both lower plug body retaining ring 13 and retaining ring 21 may either be an uninterrupted, continuous ring or a series of arcuate shaped members spaced jacket leg 11 and about the lower periphery of cylindrical member 16.

Located above outer cylindrical member 17 of the packer setting sleeve is packer member 23 which may be formed of any suitable elastomeric material. The packer member 23 is prevented from damage during compression and held in position by metal rings 24 and 25 which are mounted on the ends of packer member 23. The packer member 23 is held in position against upward axial movement on the packer mandrel by means of annular ring 26 which abuts the metal ring 25 of packer member 23. The annular ring 26 is fastened to the cylindrical member 16 of the packer mandrel by any suitable fastening means, such as welding.

To seal the interior of the packer mandrel to prevent the flow of water therethrough a circular plug 39 is welded to cylindrical members 14 and 16. In the center of the plug 39 is a packer member releasing collet sleeve 40 having an annular collet recess 42 and annular seal members 41 therein. Any suitable annular seal means may be used as annular seal members, such as O-ring type elastomeric seals. The packer member releasing collet sleeve 40 may be fastened to the plug 39 by any suitable fastening means, such as welding, and is braced against lateral movement by means of brace members 43, each brace member having one end fastened to the sleeve 40 with the other end attached to plug 39.

A circular plug 44 is installed in the lower portion of the packer mandrel with its outer periphery secured to the inner diameter of the inner cylindrical member 18 of the packer setting sleeve. The plug 44 may be secured to inner cylindrical member 18 by any suitable means, such as welding. A packer member setting mandrel 45 is located in the center of the plug 44. To brace the packer member setting mandrel 45 and inner circular member 18 of the packer member setting sleeve from lateral movement brace members 46 are fastened in position, each brace member having one end secured to plug 44 while the other end is secured to either the packer member setting mandrel 45 or inner cylindrical member 18 of the packer member setting sleeve.

To hold the locking dogs 27 in engagement with the upper plug body retaining ring 12 a dog locking sleeve 33 is installed in cylindrical member 14. The dog locking sleeve 33 is formed with a reduced diameter portion 33' which abuts the inner arcuate surface 30 of locking dogs 27 with shoulder 65 of sleeve 33 abutting the top portion of locking dogs 27 thereby limiting downward axial movement of sleeve 33. To prevent the dog locking sleeve 33 from being removed from the interior of cylindrical member 14 a mandrel retrieving lug 32 is attached to the upper portion of cylindrical member 14. The retrieving lug 32 may either be a single cylindrical ring welded to the cylindrical member 14 or a plurality of arcuate shaped lugs welded to the cylindrical member 14 at the desired locations. At the upper inner periphery of the dog locking sleeve 33 a tool retrieving ring 35 and a plurality of tool retrieving eyes 59 are attached to the dog locking sleeve 33 by any suitable means, such as welding. If desired, the retrieving ring 35 may be a series of arcuate shaped members, each having a tool retrieving eye 59. To secure the dog locking sleeve 33 in position thereby camming the locking dogs 27 into engagement with upper plug body retaining ring 12 a plurality of locking pins 38 contained within sleeves 37 are provided about the inner periphery of the dog locking sleeve 33, extend through aperatures 34 in dog locking sleeve 33 and engage locking pin recess 14' of cylindrical member 14. Any desired number of locking pins 38 may be used to secure the dog locking sleeve 33 in position. A brace 36 running from the inner periphery of dog locking sleeve 33 is provided for each locking pin sleeve 37 to support the locking pin sleeve 33 against movement. To bias the dog locking pins 38 into the locking pin recess 14' in cylindrical member 14 a pressure equalization plug 54 having a plug eye 58 is positioned in packer member releasing collet sleeve 40 so that the upper portion of the plug 54 abuts the ends of locking pins 38. The pressure equalization plug 54 is held in position by shear pins 57 threadly engaging plug 54 at threaded aperatures 56 and collet sleeve 40 until such time as it is desired to remove the plug 54 from sleeve 40. Annular seal members 41 sealingly engage the surface of plug 54 to prevent leakage of water between the plug 54 and sleeve 40 into the jacket leg 11 above the plug body 10.

Packer member releasing collet 50 is held in position in collet releasing sleeve 40 by means of the enlarged ends 52 of collet fingers 51 which are separated by spaces 53 mating with recess 42 in collet releasing sleeve 40. The lower portion 55 of the pressure equalization plug 54 biases the ends 52 of collet finger 51 into the recess 42 thereby preventing the removal of collet 50 from collet releasing sleeve 40 until the plug 54 is removed.

The lower end of collet 50 is secured to the packer setting mandrel tube 47 by any suitable means, such as welding. The packer setting mandrel tube 47 is concentrically aligned with and passes through packer setting mandrel 45 terminating exteriorly of circular plug 44. The lower end 48 of tube 47 is threaded to receive packer locking nut 49 thereon.

As further shown in FIG. 1, a cable 60 is connected to plug eye 58 and ring 62 with cables 61 being connected to retrieving eyes 59 and ring 62. The cables 61 are longer than cable 60 thereby allowing the pressure equalization plug 54 to be removed from packer member releasing collet sleeve 40 before any movement of locking dog sleeve 33 would occur. The ring 62 is further connected to cable 63 which terminates exteriorly of the jacket leg 11.

To install the plug body 10 in a jacket leg 11, the upper plug body retaining ring 12 is welded in position in the jacket leg 11 at the desired location. Subsequently, the plug body 10 is moved in position with the angular, arcuate surface 28 of the locking dogs 27 abutting the angular, arcute surface 12' of upper plug body retaining ring 12. The lower plug body retaining ring 13 is positioned against retaining ring 21 of the plug body 10 and welded in position. At this time the plug body is trapped from axial movement within the jacket leg 11.

Figure 2:
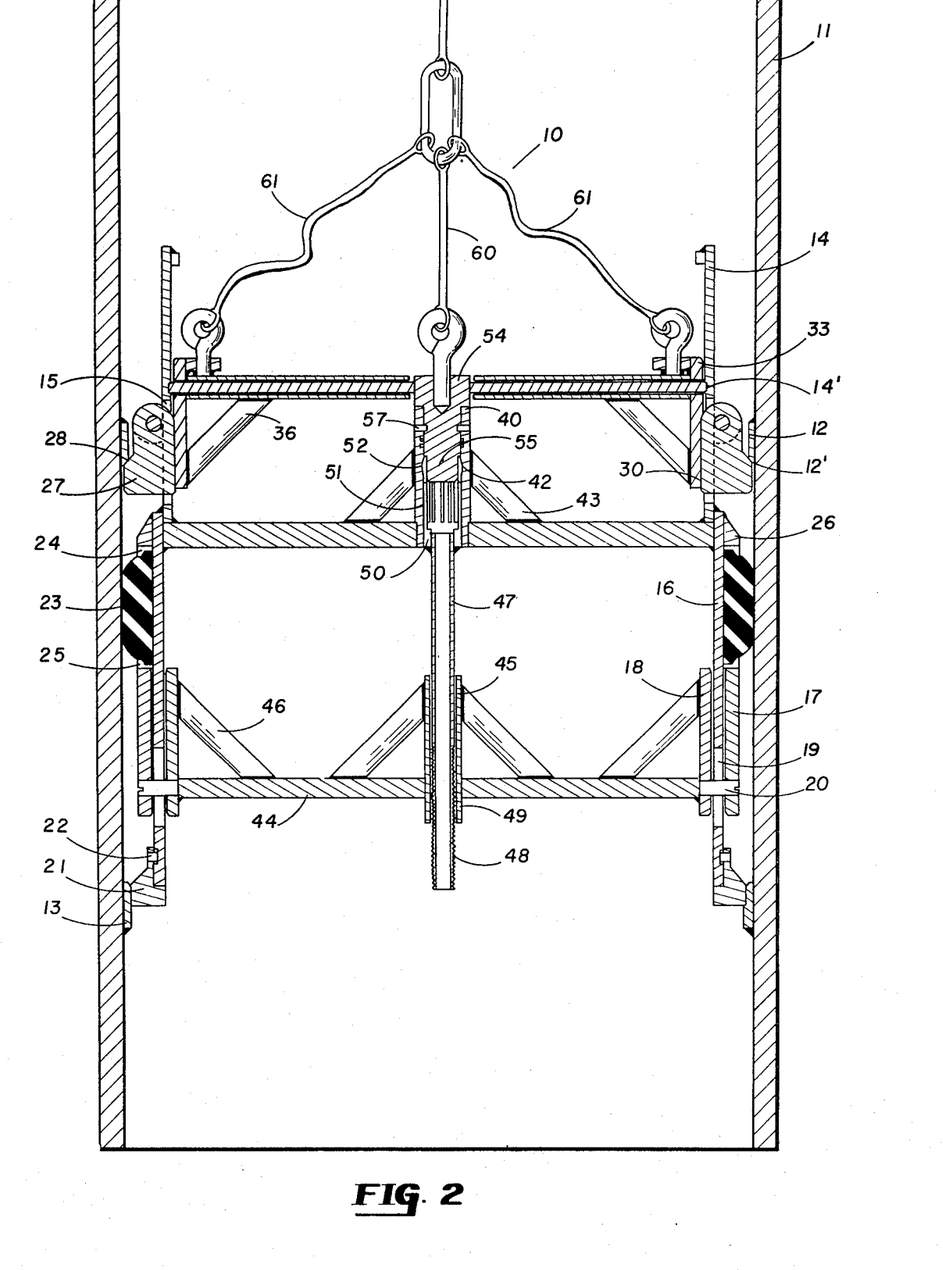
FIG. 2 is a cross-sectional view of the invention installed in a jacket leg with the compression type packer member in sealing engagement with the jacket leg.

As shown in FIG. 2, the packer member 23 is compressed into engagement with jacket leg 11 thereby setting the plug body 10 in sealing engagement with jacket leg 11.

To compress the packer member 23 into engagement with jacket leg 11 a hydraulic jack or other device is attached to the threaded end portion 48 of the packer setting mandrel tube 47 to apply sufficient force to the packer setting sleeve to compress the packer member 23 to seal the annulus between the plug body 10 and jacket leg 11. During the packer setting process, the packer member 23 is compressed between the annular ring 26 and outer cylindrical member 17 of the packer setting sleeve. Once the packer member 23 is set to seal the annulus between the plug body 10 and jacket leg 11, the packer locking nut 49 is advanced to abut the packer setting mandrel 45 at which time the jack or other setting device may be removed from the threaded end portion 48 of the packer setting mandrel tube 47. The mandrel tube 47 is prevented from axial movement by being secured at its upper end by means of the enlarged ends 52 of the collet finger 51 being trapped in the annular recess 42 of the collet sleeve 40 by the lower end 55 of the pressure equalization plug 54.

It should be noted that any forces applied from below the plug body 10 will set the packer member 23 tighter in the annulus between the plug body 10 and jacket leg 11. The axial loading on the plug body 10 in one direction in the jacket leg 11 is carried by locking dogs 27 abutting upper plug body retaining ring 12 while axial loading in the other direction in the jacket leg 11 is carried by retaining ring 21 abutting lower plug retaining ring 13. Additionally, when the packer member 23 is set, any water entering packer mandrel tube 47 is prevented from entering the portion of the jacket leg 11 above circular plug 39 by the annular seals 41 engaging pressure equalization plug 54.

Figure 3:
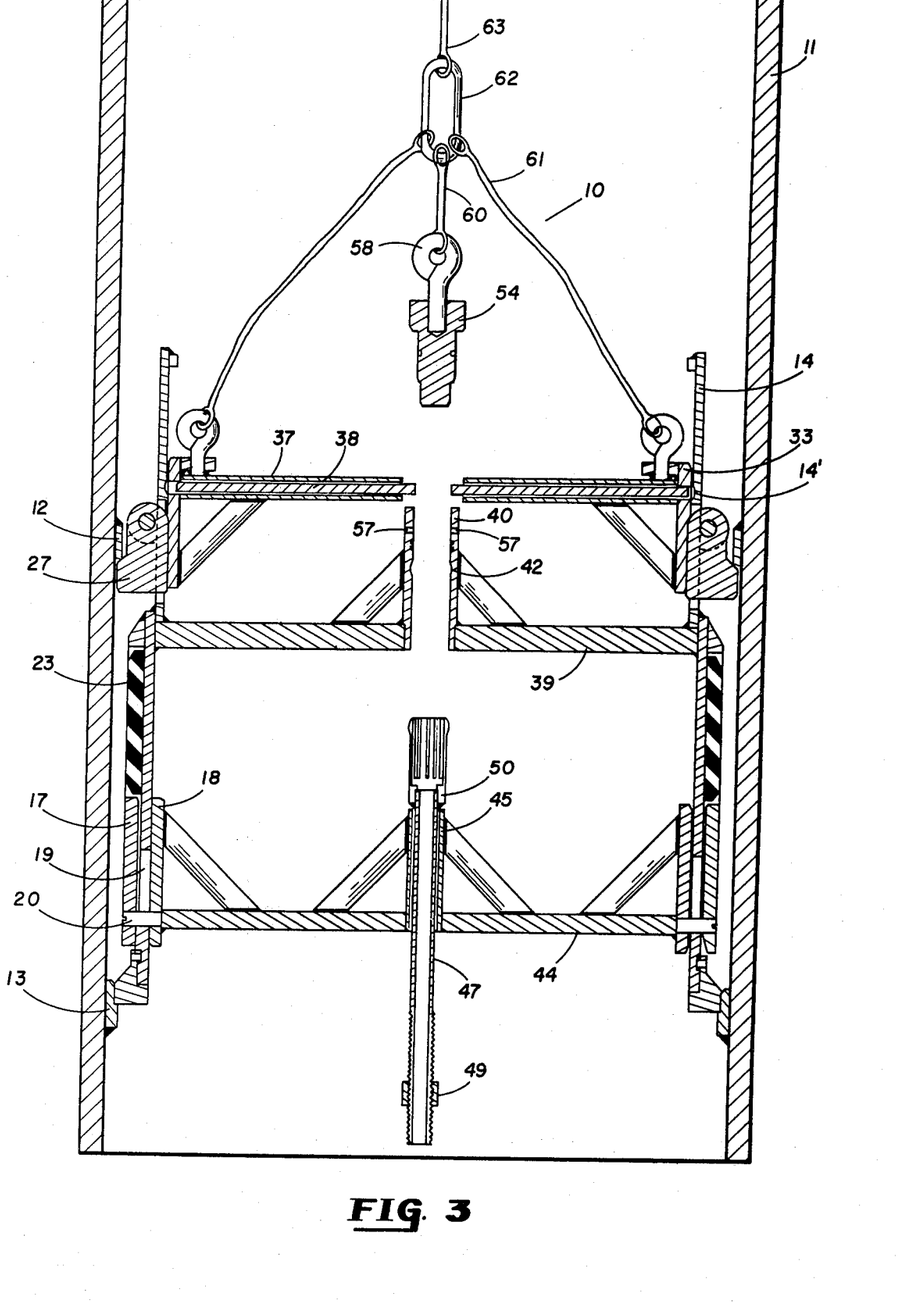
FIG. 3 is a cross-sectional view of the invention installed in a jacket leg with the pressure equalization plug removed from the packer releasing collet sleeve and with the compression type packer member in its uncompressed state.

Referring to FIG. 3, the plug body 10 is shown with the pressure equalization plug 54 removed from the collet releasing sleeve 40. To remove the pressure equalization plug 54 from the collet releasing sleeve 40 a force is applied to cable 63 through ring 62, cable 60 and eye 58 sufficient to shear pressure equalization plug shear pins 57. When the pressure equalization 54 plug is removed from the collet releasing sleeve 40, the collet 50 which is connected packer member setting mandrel tube 47 is removed from the collet releasing sleeve 40 by the expansion of the compressed packer member 23 acting through the packer setting sleeve and, in turn, the packer member setting mandrel 45 which abuts packer locking nut 49 on the packer setting mandrel tube 47. Once the pressure equalization plug 54 is removed from collet releasing sleeve 40, water beneath the plug body 10 is free to flow upwardly through collet releasing sleeve 40 to fill the portion of the jacket leg 11 above the plug body 10.

Since the cable 60 connected to the pressure equalization plug 54 is of shorter length than cables 61 connected to dog locking sleeve 33, the pressure equalization plug 54 can be removed without releasing locking dogs 27 from engagement with retaining ring 12. It is necessary to initially maintain the plug body 10 in position in the jacket leg 11 after removal of the pressure equalization plug 54 to prevent the plug body 10 from being rapidly forced up the jacket leg 11 by the pressure of the water beneath the plug body 10.

As shown in FIG. 3, once the pressure equalization plug 54 has been removed from collet releasing sleeve 40, the locking pins 38 are free to move in sleeves 37 out of engagement with locking pin recess 14' of cylindrical member 14. Although the locking pins 38 are no longer in engagement with the recess 14' of cylindrical member 14, the dog locking sleeve 33 remains in position holding the locking dogs 27 in engagement with retaining ring 12 until such time as a force is applied to cables 61 which, in turn, is applied through tool retrieving eyes 59 and retrieving ring 35 to dog locking sleeve 33.

Figure 4:
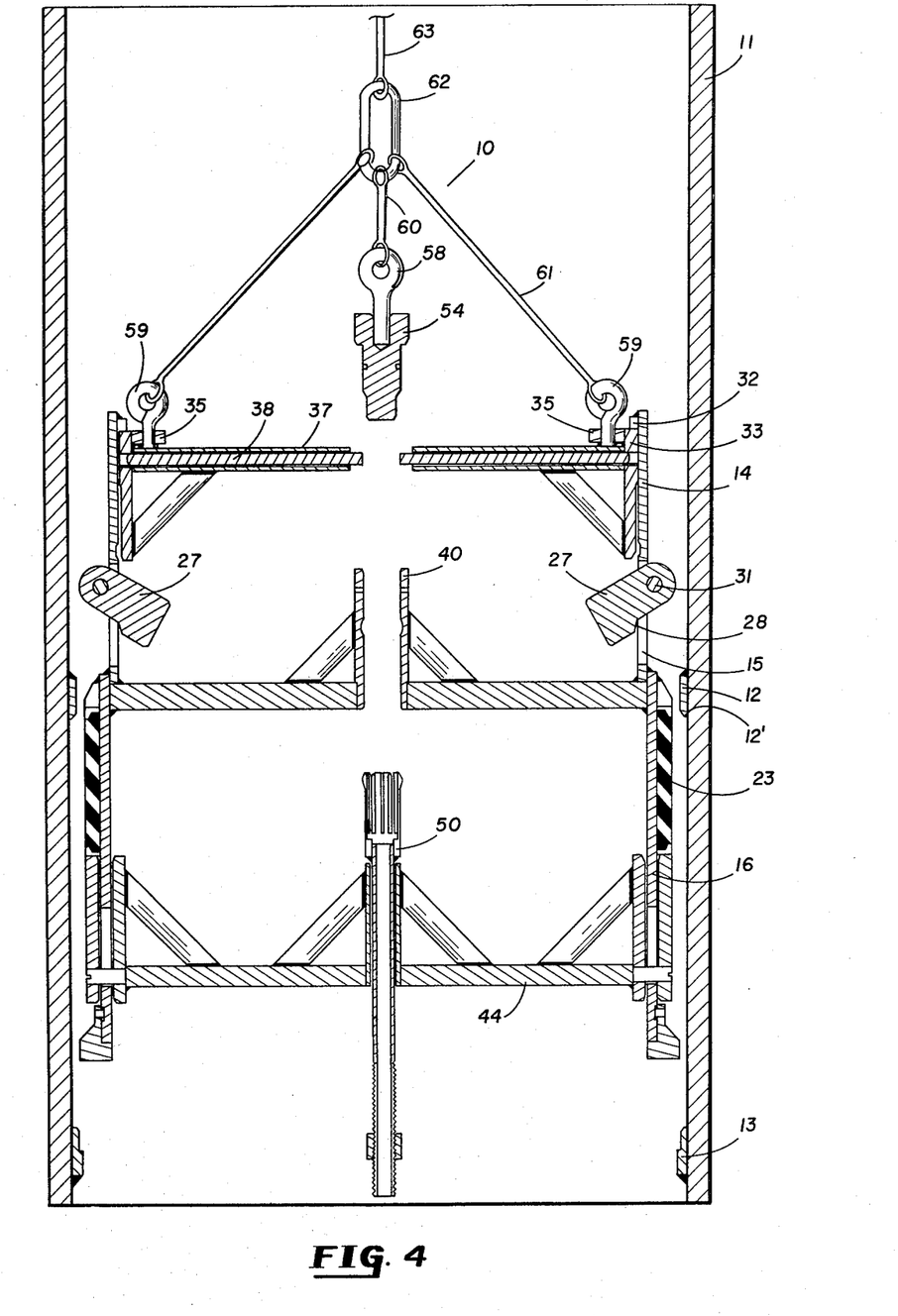
FIG. 4 is a cross-sectional view of the invention installed in a jacket leg with the locking dogs released from engagement with the upper plug body retaining ring thereby allowing the plug body to be removed from the jacket leg.

Referring to FIG. 4, the plug body 10 is shown being retrieved from the jacket leg 11. When a force is applied to cables 61 through tool retrieving eyes 59 and retrieving ring 35, the dog locking sleeve 33 moves upwardly until it abuts retrieving lug 32 at which time the locking dogs 27 are free to pivot about pins 31 and through slots 15 in cylindrical member 14 thereby releasing the plug body 10 for movement in jacket leg 11. Once the dog locking sleeve 33 is free of locking dogs 27, any upward force on plug body 10 will cause the locking dogs 27 to be cammed inwardly by virtue of the angular, arcuate faces 28 of the locking dogs 27 abutting the complimentary angular, arcuate face 12' on upper plug body retaining ring 12.

When the dog locking sleeve 33 abuts retrieving ring 32 and the locking dogs 27 are free of retaining ring 12, the plug body 10 may be removed from the jacket leg 11 by hauling on cable 63.

Figure 5:
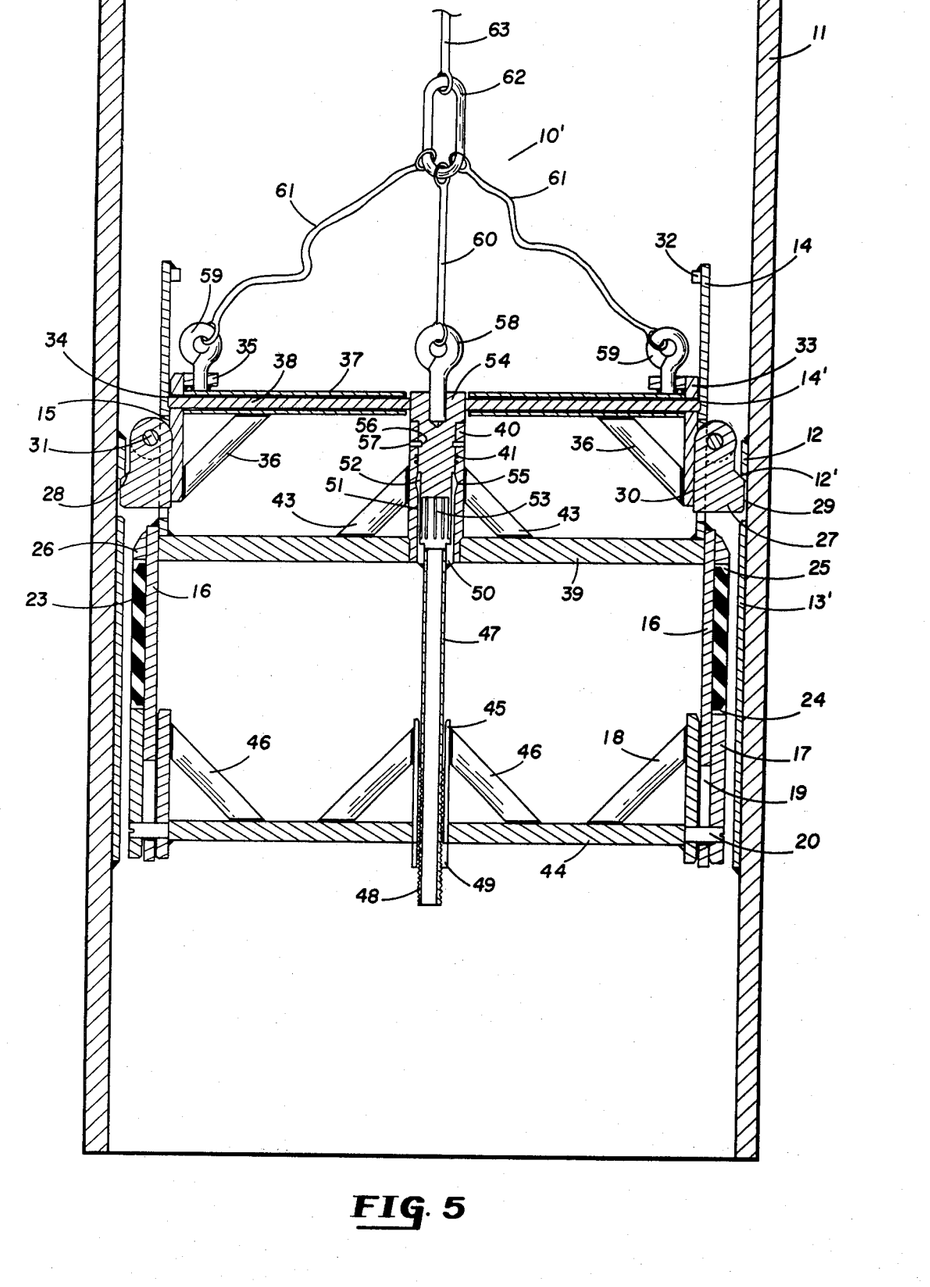
FIG. 5 is an alternative embodiment of the invention installed in a jacket leg having a lower plug body retaining ring on which the compression packer member sealingly engages to seal the annulus between the plug body and jacket leg with the compression packer member not being compressed.

Referring to FIG. 5, a modified embodiment of the plug body 10' is shown. The plug body 10' is identical to the plug body 10 except for the deletion of plug body retaining ring 21 and its associated fastening means 22 and a longer length continuous, uninterrupted lower plug body retaining ring 13'.

The plug body 10' is suitable for use in a jacket leg 11 in those situations where it is impossible or undesirable to use the plug body 10 having plug body retaining ring 21 and lower stepped plug body retaining ring 13. The plug body 10' offers the advantage of equal clearance between the plug body 10' and the jacket leg 11 having upper plug body retaining ring 12 and lower plug body retaining ring 13' thereon thereby allowing a plurality of plug bodies to be used in the same jacket leg, if so desired.

As shown in FIG. 5, the lower plug body retaining ring 13' is a continuous uninterrupted ring installed in the jacket leg 11 extending from approximately the bottom end of the plug body 10' to the juncture of the cylindrical members 14 and 16 of the packer mandrel which juncture is adjacent the lower surface of locking dogs 27. The lower plug body retaining ring 13' when welded in position in the jacket leg 11 serves as both a sealing surface for the packer member 23 thereby requiring less compression of the packer member 23 to seal the annulus between the plug body 10' and the jacket leg 11 and as an axial retaining means for the plug body 10' which will abut the lower surface of the locking dogs 27. The installation of the plug body 10' in the jacket leg 11 is identical to that set forth with respect to the preferred embodiment.

Figure 6:
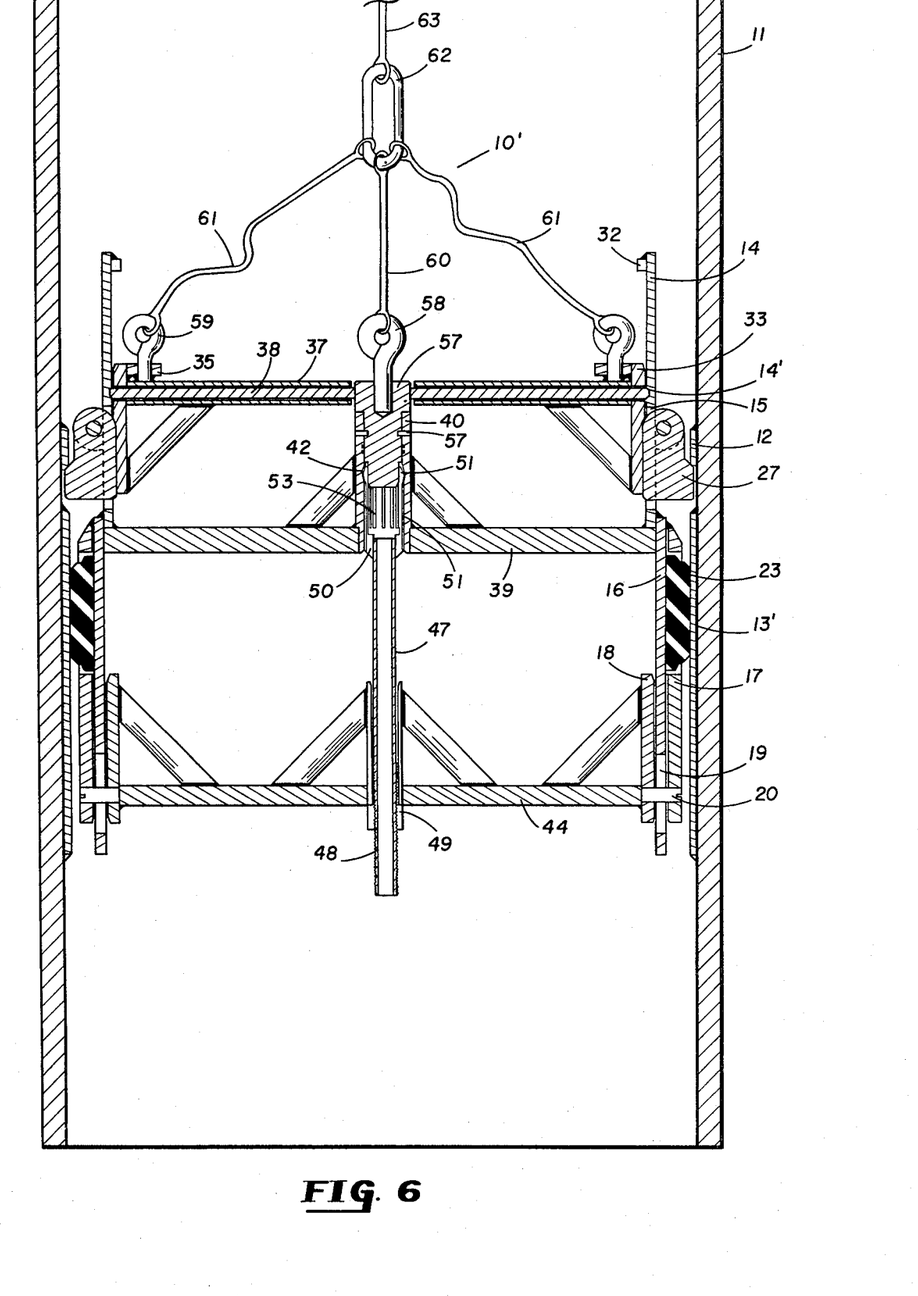
FIG. 6 is an alternative embodiment of the invention having a lower plug body retaining ring on which the compression packer member is sealingly engaged to seal the annulus between the plug body and jacket leg.

Referring to FIG. 6, the plug body 10' is shown in the jacket leg 11 having the packer member 23 compressed in sealing engagement with lower plug body retaining ring 13.

Since the plug body 10' is similar to the plug body 10 described hereinbefore except as noted, the method of compressing the packer member 23, the method of releasing the packer member 23 and equalizing the fluid pressure across the plug body 10' and the method of retrieving the plug body 10' are the same as those set forth hereinbefore with respect to the plug body 10.

Figure 7:
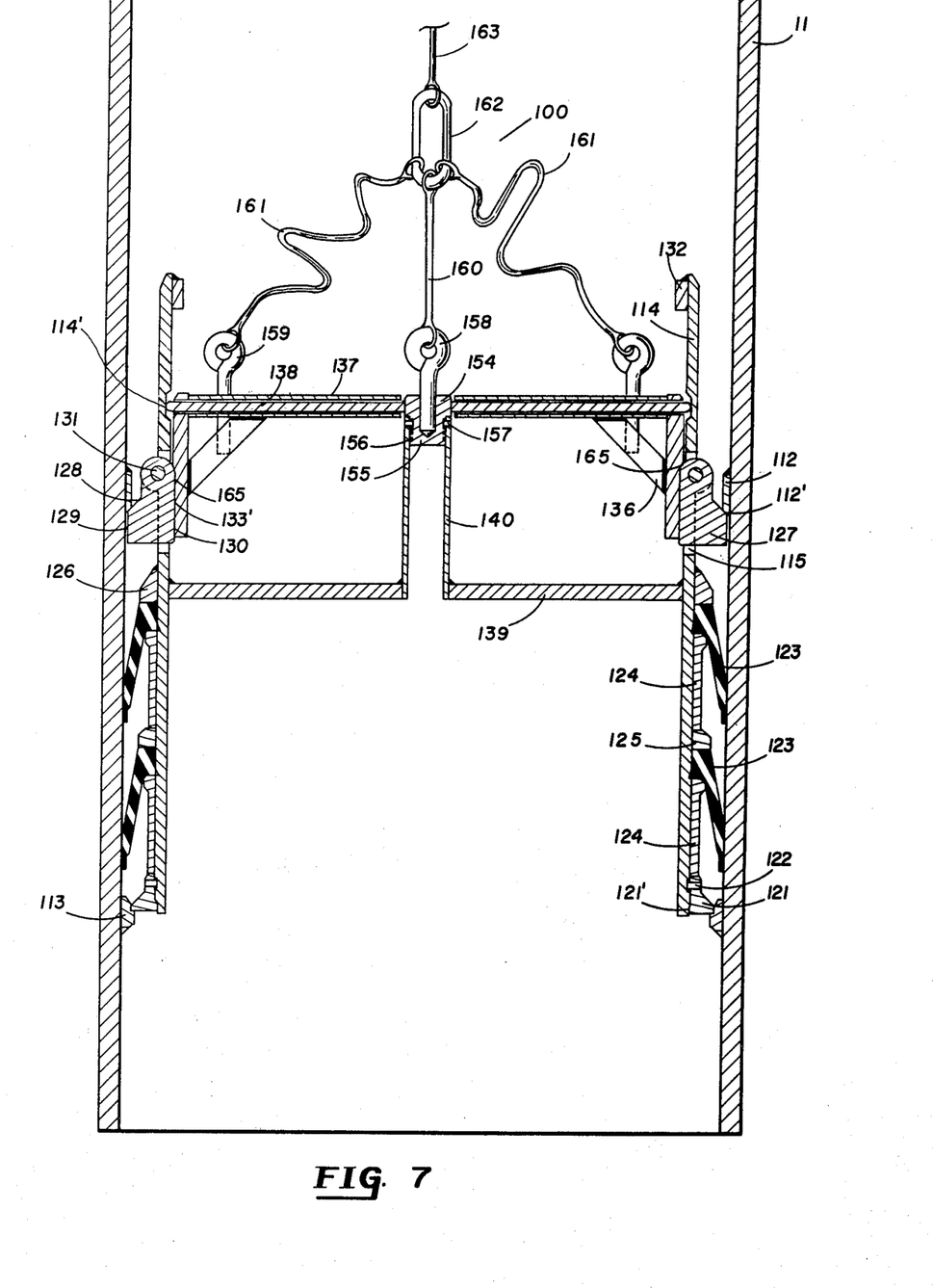
FIG. 7 is an alternative embodiment of the invention having cup type seal members rather than a compression type packer member sealing the annulus between the plug body and jacket leg.

Referring to FIG. 7, an alternative embodiment retrievable plug is shown. The retrievable plug comprises a plug body 100 and upper body retaining ring 112 and lower plug body retaining ring 113 to restrain the plug body from movement within the jacket leg 11.

The plug body 100 comprises a seal cup mandrel, seal cups 123 and locking dogs 127.

The seal cup mandrel is formed by cylindrical member 114. The cylindrical member 114 has a plurality of locking dogs 127 mounted thereon in slots 115 to mate with upper retaining ring 112 thereby preventing axial movement of the plug body 100 in one direction of the jacket leg 11. Each locking dog 127 is pivotally attached to the cylindrical member 114 by means of a mounting pin 131, which in turn, is attached to cylindrical member 114 by means of ears 164 (shown in phantom) or any other suitable fastening means, such as welding. Each locking dog 127 is formed with an angular, arcuate peripheral face 128 which mates with a corresponding angular, arcuate peripheral face 112' of upper retaining ring 112, an outer arcuate peripheral face 129 and an inner arcuate peripheral face 130 which abuts dog locking sleeve 133.

About the lower periphery of the cylindrical member 114 is mounted a plug body retaining ring 121 secured to cylindrical member 114 by means of fasteners 122 and having a shoulder 121' abutting the end of cylindrical member 114.

The retaining ring 121 mates with lower stepped plug body retaining ring 113 to prevent axial movement of the plug body 100 in the other direction in the jacket leg 11. Both lower plug body retaining ring 113 and retaining ring 121 may be an uninterrupted, continuous ring or a series of arcuate shaped member spaced about either the inner diameter of the jacket let 11 or the lower periphery of cylindrical member 114.

Located on the exterior of the portion of the cylindrical member 114 below locking dogs 127 are a plurality of cup type seal members 123 which may be formed of any suitable elastomeric material. Although any number of cup type seal members 123 may be used on the plug body 100, two are usually preferred. The seal cups 123 are held in position on the cylindrical member 114 by means of seal cup spacer rings 124 and annular rings 125 and 126. The seal cup spacer rings 124 are installed to abut the lower cylindrical surface of the central portion of the seal cups 123 while the annular rings 125 and 126 abut the upper diameter of the central portion of the seal cups 123. Annular ring 126 is slightly longer in axial length than annular ring 125 and is secured against axial movement on the cylindrical member 114 by means of welding.

To seal the interior of the cylindrical member 114, a circular plug 139 is welded to the cylindrical member 114 below the locking dogs 127. In the center of the plug 139 is a sleeve 140 which has a pressure equalization plug 154 installed in the upper end thereof. The sleeve may be secured to the plug 139 by any convenient means, such as welding. To seal between the sleeve 140 and the pressure equalization plug 154, the lower portion 155 of the plug 154 has a plurality of annular seal members 156 located thereon. Any suitable annular seal means may be used as annular seal members, such as O-ring type elastomeric seals. To retain the pressure equalization plug 154 in the sleeve 140 a plurality of shear pins 157 threadly engage the plug 154 and the sleeve 140.

To hold the locking dogs in engagement with the retaining ring 112 a dog locking sleeve 133 is installed in the cylindrical member 114. The dog locking sleeve 133 is formed with a reduced diameter portion 133' which abuts the inner arcuate surface 130 of the locking dogs 127 with shoulder 165 of sleeve 133 abutting the top portion of locking dogs 127 thereby limiting downward axial movement of sleeve 133. To prevent the dog locking sleeve 133 from being removed from the interior of cylindrical member 114 a mandrel retrieving lug 132 is attached to the upper portion of cylindrical member 114. The retrieving lug 132 may be a single cylindrical ring welded to the cylindrical member 114 or a plurality of arcuate shaped lugs welded to the cylindrical member 114 at the desired locations.

To secure the dog locking sleeve 133 in position thereby camming the locking dogs 127 into engagement with upper plug body retaining ring 112 a plurality of locking pins 138 contained within sleeves 137 having plug body retrieving eyes 159 thereon are provided about the inner periphery of the dog locking sleeve 133, extend through apertures 134 in dog locking sleeve 133 and engage locking pin recesses 114' of cylindrical member 114. Any desired number of locking pins 138 may be used to secure the dog locking sleeve 133 in position. A brace 136 running from the inner periphery of dog locking sleeve 133 is provided for each locking pin sleeve 137 to support the locking pin sleeve 33 against movement.

To bias the dog locking pins 38 into the locking pin recesses 114' in cylindrical member 114 the pressure equalization plug 154 having a plug eye 158 is positioned in the sleeve 140 such that the upper portion of the plug 154 abuts the ends of locking pins 138. When installed, the pressure equalization plug 154 is held in position by shear pins 157 threadedly engaging both the plug 154 and sleeve 140 until such time as it is desired to remove the plug 154 from sleeve 140.

When installed in the jacket leg 11, the plug body 100 has a cable 160 connecting the pressure equalization plug eye 158 to ring 162 and cables 161 which are of longer length than cable 160 connecting plug body retrieving eyes 159 to ring 162. A cable 163 which runs to the surface of jacket leg 11 is further connected to ring 162.

To install the plug body 100 in a jacket leg 11, the upper plug body retaining ring 112 is welded to the jacket leg 11 at the desired location. Subsequently, the plug body 100 is positioned in the jacket leg 11 with the locking dogs 127 abutting the surface 112' of the upper plug body retaining ring 112. Next, the lower plug body retaining ring 113 is positioned in the jacket leg 11 to abut the retaining ring 121 and welded in position. At this time, the lower plug body retaining ring 113 prevents downward movement of the plug body 100 in the jacket leg 11 and serves to center the plug body 100 in the jacket leg 11. When installed in the jacket leg 11, the sealing cups 123 seal the annulus between the plug body 100 and the jacket leg 11 to prevent fluid movement into the jacket leg 11 above the plug body 100. As can be readily seen, any fluid pressure increase below the seal cups 123 serves to press the seal cups 123 more tightly against the jacket leg 11.

Figure 8:
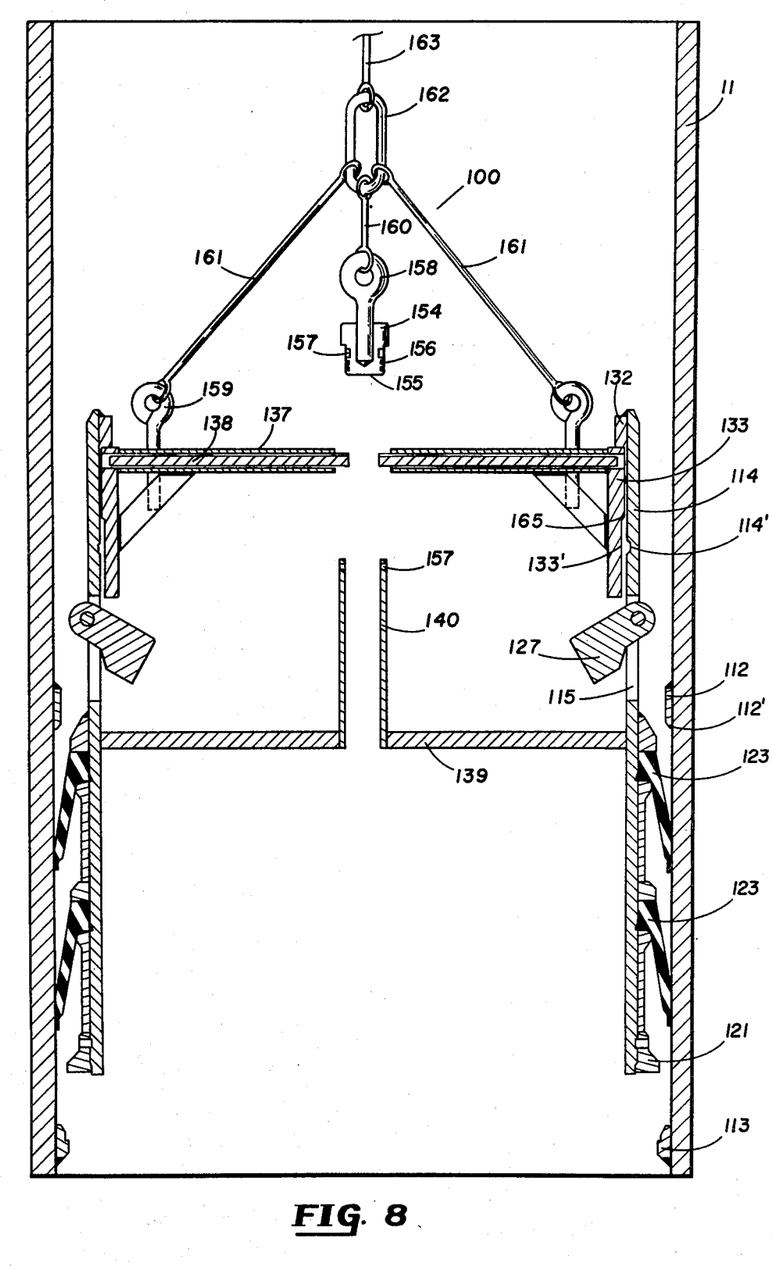
FIG. 8 is an alternative embodiment of the invention having cup type seal members with the pressure equalization plug removed from the seal cup mandrel sleeve thereby allowing the plug body to be removed from the jacket leg.

Referring to FIG. 8, the plug body 100 is shown being retrieved from jacket leg 11.

To retrieve the plug body 100 from the jac'.et leg 11, a force is applied to the cable 163 through ring 162, cable 160 and eye 158 to remove the pressure equalization plug 154 from sleeve 140. Since the cable 160 is shorter than cables 161, the pressure equalization plug 154 may be removed without moving dog locking sleeve 133. After a sufficient force has been applied to pressure equalization plug 154 to shear pins 157 thereby allowing the plug 154 to be removed from sleeve 140, water from below the plug body 100 flows through sleeve 140 to fill the jacket leg 11 above the plug body 100 to equalize the pressure across seal cups 123. After the water pressure across seal cups 123 has been equalized, a force is again applied to cable 163 through ring 162, cables 161 and plug body retrieving eyes 159 to move dog locking sleeve 133 upwardly in the cylindrical member 114 until it abuts retrieving lug 132. The dog locking sleeve 133 is free to move upwardly in cylindrical member 114 upon the application of an upward force since the removal of pressure equalization plug 154 allows the locking pins 138 to disengage annular recess 114' in the cylindrical member 114. Once the dog locking sleeve 133 is free of locking dogs 127, any upward force on the plug body 100 will cause the locking dogs 127 to be cammed inwardly by virtue of the angular, arcuate faces 128 of the locking dogs 127 abutting complimentary angular, arcuate face 112' on upper plug body retaining ring 112.

When the dog locking sleeve 33 abuts retrieving ring 132 and the locking dogs 127 are free of retaining ring 112, the plug body 100 may be removed from the jacket leg 11 by hauling on cable 163.

Although the plug body 100 has been illustrated with a lower stepped plug body retaining ring 113 which mates with retaining ring 121 on cylindrical member 114, it is contemplated that the lower plug body retaining ring may be an uninterrupted, continuous ring which would extend from approximately the bottom end of cylindrical member 114 to slightly below the locking dogs 127. If lower plug body retaining ring 113 were an uninterrupted, continuous ring, the retaining ring 121 on cylindrical member 114 could be eliminated with the lower seal cup retaining ring 123 being secured to the cylindrical member 114 by suitable fasteners or by welding.

If an uninterrupted, continuous lower plug body retaining ring were used, the plug body retaining rings 112 and 113 and their relationship to the locking dogs 127 would be identical to that shown in FIGS. 5 and 6 with the same resultant advantages concerning the capability of using multiple plug bodies 100 in the same jacket leg 11.

Although the plug bodies 10, 10' and 100 and their retaining means have been described in relationship to a jacket leg 11 of an offshore platform, the plug bodies and retaining means could be used to seal any circular member of any desired diameter where a temporary seal is desired, such as pipes, conduits, etc.

While the invention has been described with reference to preferred and alternative embodiments, it will be appreciated by those skilled in the art that additions, deletions, modifications and substitutions, or other changes not specifically described may be made which fall within the purview of the appended claims.

What is claimed as new and desired to be secured by Letters Patent is:

1. A removable plug for temporarily sealing the interior of an annular member to prevent the flow of fluid therethrough, said removable plug comprising:
plug body means disposed within said annular member, the plug body means including:
annular seal cup mandrel means having annular recess means about the interior thereof;
seal cup means located on the annular seal cup mandrel means for sealingly engaging the interior of said annular member to prevent the flow of said fluid therethrough;
plug means having a centrally located sleeve therein, the plug means being secured to the interior of the annular seal cup mandrel means;
pressure equalization plug means releasably retained in the centrally located sleeve in the plug means in the plug body means for allowing the flow of said fluid through said removable plug before the removal of said removable plug from said annular member;
locking dog means pivotally mounted on the annular seal cup mandrel means for retaining said removable plug from axial movement in at least one direction in said annular member;
dog locking sleeve means slidably abutting the locking dog means; and
dog locking sleeve pin means having one end engaging the annular recess means about the interior of the annular seal cup mandrel means and having the other end abutting the pressure equalization plug means releasably secured in the centrally located sleeve in the plug means in the annular seal cup mandrel means.

2. The removable plug of claim 1 further comprising:
upper plug body retaining means secured to the interior of said annular member for retaining said removable plug from axial movement in one direction within said annular member by engaging the locking dog means; and
lower plug body retaining means secured to the interior of said annular member for retaining said removable plug from axial movement in the other direction within said annular member.

3. The removable plug of claim 1 wherein the plug body means further includes:
retrieving lug means secured to the annular seal cup mandrel means to prevent the dog locking sleeve means from disengaging the interior of the annular seal cup mandrel means; and
retaining means located on the annular seal cup mandrel means retaining said removable plug from axial movement in another direction in said annular member.

4. The removable plug of claim 1 wherein the locking dog means comprise a plurality of arcuate shaped members, each member having an angular, arcuate-shaped face located on the outer periphery of the locking dog means, each locking dog means of the plurality being pivotally mounted on the annular seal cup mandrel means.

5. A removable plug for temporarily sealing the interior of an annular member to prevent the flow of fluid therethrough, said removable plug comprising:
plug body means disposed within said annular member, the plug body means including:
annular seal cup mandrel means having annular recess means about the interior thereof;
seal cup means located on the annular seal cup mandrel means for sealingly engaging the interior of said annular member to prevent the flow of said fluid therethrough;
plug means having a centrally located sleeve therein, the plug means being secured to the interior of the annular seal cup mandrel means;
pressure equalization plug means releasably retained in the centrally located sleeve in the plug means in the plug body means for allowing the flow of said fluid through said removable plug before the removal of said removable plug from said annular member;
locking dog means pivotally mounted on the seal cup mandrel means for retaining said removable plug from axial movement in at least one direction in said annular member;
dog locking sleeve means slidably abutting the locking dog means; and
dog locking sleeve pin means having one end engaging the annular recess means about the interior of the seal cup mandrel means and having the other end abutting the pressure equalization plug means releasably secured in the centrally located sleeve in the plug means in the annular seal cup mandrel means;
upper body retaining means secured to the interior of said annular member for retaining said removable plug from axial movement in one direction within said annular member by engaging the locking dog means; and
lower plug body retaining means secured to the interior of said annular member for retaining said removable plug from axial movement in the other direction within said annular member.

6. The removable plug of claim 5 wherein the plug body means further includes:
retrieving lug means secured to the annular seal cup mandrel means to prevent the dog locking sleeve means from disengaging the interior of the annular seal cup mandrel means; and
retaining means located on the annular seal cup mandrel means retaining said removable plug from axial movement in another direction in said annular member.

7. The removably plug of claim 5 wherein the locking dog means comprise a plurality of arcuate shaped members, each member having an angular, arcuate-shaped face located on the outer periphery of the locking dog means, each locking dog means of the plurality being pivotally mounted on the annular seal cup mandrel means.

8. A removable plug for temporarily scaling the interior of the leg of an offshore platform or other similar annular member, said removable plug comprising:
plug body means disposed within said leg or other similar annular member, the plug body means including:
annular seal cup mandrel means having annular recess means about the interior thereof;
seal cup means located on the annular seal cup mandrel means for sealingly engaging the interior of said leg or other similar annular member;
plug means having a centrally located sleeve therein, the plug means being secured to the interior of the annular seal cup mandrel means;
pressure equalization plug means releasably retained in the centrally located sleeve in the plug means in the plug body means;
locking dog means pivotally mounted on the annular seal cup mandrel means for retaining said removable plug from axial movement in at least one direction in said leg or other similar annular member;
dog locking sleeve means slidably abutting the locking dog means; and
dog locking sleeve pin means having one end engaging the annular recess means about the interior of the annular seal cup mandrel means and having the other end abutting the pressure equalization plug means releasably secured in the centrally located sleeve in the plug means in the annular seal cup mandrel means.

9. The removable plug of claim 8 further comprising:
upper plug body retaining means secured to the interior of said leg or other similar annular member for retaining said removable plug from axial movement in one direction within said leg or other similar annular member by engaging the locking dog means; and
lower plug body retaining means secured to the interior of said leg or other similar annular member for retaining said removable plug from axial movement in the other direction within said annular member.

10. The removable plug of claim 8 wherein the plug body means further includes:
retrieving lug means secured to the annular seal cup mandrel means to prevent the dog locking sleeve means from disengaging the interior of the annular seal cup mandrel means; and
retaining means located on the annular seal cup mandrel means retaining said removable plug from axial movement in another direction in said annular member.

11. The removable plug of claim 8 wherein the locking dog means comprise a plurality of arcuate shaped members, each member having an angular, arcuate-shaped face located on the outer periphery of the locking dog means, each locking dog means of the plurality being pivotally mounted on the annular seal cup mandrel means.

12. A removable plug for temporarily sealing the interior of the leg of an offshore platform or other similar annular member, said removable plug comprising:
plug body means disposed within said leg or other similar annular member, the plug body means including:
annular seal cup mandrel means having annular recess means about the interior thereof;
seal cup means located on the annular seal cup mandrel means for sealingly engaging the interior of said leg or other similar annular member;
plug means having a centrally located sleeve therein, the plug means being secured to the interior of the annular seal cup mandrel means;
pressure equalization plug means releasably retained in the centrally located sleeve in the plug means in the plug body means;

locking dog means pivotally mounted on the annular seal cup mandrel means for retaining said removable plug from axial movement in at least one direction in said leg or other similar annular member;

dog locking sleeve means slidably abutting the locking dog means; and dog locking sleeve pin means having one end engaging the annular recess means about the interior of the annular seal cup mandrel means and having the other end abutting the pressure equalization plug means releasably secured in the centrally located sleeve in the plug means in the annular seal cup mandrel means;

upper plug body retaining means secured to the interior of said leg or other similar annular member for retaining said removable plug from axial movement in one direction within said leg or other similar annular member by engaging the locking dog means; and lower plug body retaining means secured to the interior of said leg or other similar annular member for retaining said removable plug from axial movement in the other direction within said annular member.

13. The removable plug of claim 12 wherein the plug body means further includes:

retrieving lug means secured to the annular seal cup mandrel means to prevent the dog locking sleeve means from disengaging the interior of the annular seal cup mandrel means; and retaining means located on the annular seal cup mandrel means retaining said removable plug from axial movement in another direction in said leg or other similar annular member.

14. The removable plug of claim 12 wherein the locking dog means comprise a plurality of arcuate shaped members, each member having an angular, arcuate-shaped face located on the outer periphery of the locking dog means, each locking dog means of the plurality being pivotally mounted on the annular seal cup mandrel means.

* * * * *